United States Patent

Watanuki et al.

[11] Patent Number: 5,671,621
[45] Date of Patent: Sep. 30, 1997

[54] KEY CYLINDER DEVICE FOR AN AUTOMOBILE

[75] Inventors: Yoshio Watanuki, Ebina; Harumi Okazaki, Hadano, both of Japan

[73] Assignee: Nissan Motor Co., Ltd., Kanagawa-ken, Japan

[21] Appl. No.: 517,864

[22] Filed: Aug. 22, 1995

[30] Foreign Application Priority Data

Aug. 24, 1994 [JP] Japan ................. 6-199763

[51] Int. Cl.⁶ ............................................. E05B 49/00
[52] U.S. Cl. ................................. 70/278; 235/493
[58] Field of Search ......................... 70/252, 277, 278, 70/413, 454; 307/10.2–10.5; 235/493, 492

[56] References Cited

U.S. PATENT DOCUMENTS

| 5,003,801 | 4/1991 | Stinar et al. ................... 70/278 |
| 5,043,593 | 8/1991 | Tsutsumi et al. ............... 70/278 X |
| 5,117,097 | 5/1992 | Kimura et al. ................. 70/278 X |
| 5,156,032 | 10/1992 | Edgar ............................ 70/278 |
| 5,309,743 | 5/1994 | Kokubu et al. ................. 70/278 X |
| 5,398,532 | 3/1995 | Janssen et al. ................. 70/278 X |
| 5,433,096 | 7/1995 | Janssen et al. ................. 70/278 |

FOREIGN PATENT DOCUMENTS

| 3-111766 | 11/1991 | Japan . |
| 3-121982 | 12/1991 | Japan . |
| 4-15141 | 3/1992 | Japan . |

*Primary Examiner*—Suzanne Dino
*Attorney, Agent, or Firm*—Lowe, Price, LeBlanc & Becker

[57] ABSTRACT

The portion where the antenna wire is wound to the circular groove on the outer periphery of the bobbin of the core of the antenna coil is covered with an amplifier case base material and is molded integrally with the one side portion of the amplifier case attached to the key cylinder in such a state that the one side end portion of the core is exposed, and the exposed end portion of the core is fixed so as to make its end face roughly matched with the end face of the key cylinder.

3 Claims, 3 Drawing Sheets

KEY CYLINDER DEVICE FOR AN AUTOMOBILE

BACKGROUND OF THE INVENTION

1. Field of the Invention

The present invention relates to a key cylinder device provided in a steering lock device and a door lock device of an automobile.

2. Description of the Prior Art

In order to prevent the automobile from being stolen, there have conventionally been known such a device as described in Japanese Unexamined Utility Model Publication No. Hei 3-111766, Japanese Unexamined Utility Model Publication No. Hei 3-121982, and Japanese Examined Patent Publication No. Hei 4-15141, in which a circuit chip provided in a key head of a key plate and a circular antenna coil fitted and fixed to the outer periphery of the end portion of a key cylinder are magnetically coupled so as to output a drive permission signal to a drive-control device of a subject to be controlled, for example, an engine to make it possible for the engine to be initiated, and the initiation of the engine is prohibited with a key plate other than this particular key plate.

This operates in such a manner that, as shown in FIG. 1 concretely, when a circular antenna coil 3 is fitted and fixed to the outside of the end portion of a key cylinder 2 of, for example, a steering lock device 1 and a key plate 4 is inserted into the key cylinder 2, a circuit chip 5 provided in a key head 4a of the key plate 4 and the antenna coil 3 on the key cylinder 2 side are magnetically coupled to transmit the ID from the circuit chip 5 to the antenna coil 3, and the ID received by the antenna coil 3 is amplified by an amplifier and transmitted to a drive-control device of the engine (the amplifier and the drive-control device are both omitted in the drawing).

As shown in FIG. 2, the antenna coil 3 forms a core 6 by winding the antenna wire 11 to a circular groove 8 on the outer periphery of a bobbin 7 composed of an electrically insulated material under which a magnetic core material 12 comprising magnetic materials such as ferrite and the like in roughly a cylindrical shape having a L-shaped section is laid, and the end portions on the both sides of the core 6, flanges 9 and 10 and the antenna wire-wound portion are entirely covered with a resin material 13, which are fitted and fixed to the outside of the end portion of the key cylinder 2.

In FIG. 1, reference number 14 represents a steering column cover and reference number 15 represents an escutcheon which decorates the circumference where the antenna coil 3 is provided.

The antenna coil 3 is injection-molded in order to cover both the end portions of the core 6 and the antenna wire-wound portion entirely with a resin material 13. In this case, in order to set the core 6 in the central position within the molds 16 and 17, positioning pins 18 and 19 which abut against the end face of the core 6 are projectingly provided in these molds 16 and 17. Therefore, holes 20 are formed in the portions corresponding to these positioning pins 18 and 19 on both the end faces of the antenna coil 3, and particularly a hole 20 caused on the end face which becomes the indoor side and degrades the appearance.

Therefore, it is required to conceal entirely the antenna coil 3 with the escutcheon 15 so that the antenna coil 3 cannot be seen from the indoor side, by shifting it to the position a little secluded within the steering column cover 14. As a result, when the key plate 4 is inserted into the key cylinder 2, the distance between the circuit chip 5 of the key head 4a and the antenna coil 3 expands as shown by $L_1$ to cause a problem that the transmitting and receiving sensitivity between the circuit chip 5 and the antenna coil 3 is deteriorated.

Furthermore, one of the flanges of the bobbin 7, for example, the flanges 9 provided on the indoor side, is made to function as a wire guide at the time of winding the antenna wire by making the height of the flanges high. However, since the outer periphery of the bobbin is covered entirely with a resin material 13, the height h of the flanges 9 cannot be made sufficiently high and the coil thickness t is restricted in dimension, thereby possibly causing problems in the automatic winding work of the antenna wire 11.

Furthermore, since there is a big difference in the thickness to be covered by the resin material 13 between the end portion of the flanges 9 and the antenna wire-wound portion, distortion generally referred to as "sink" is likely to be caused on the outer periphery thereof not only degrading the appearance and the quality, but also easily causing poor molding because of the thin thickness to be covered of the resin material 13 of the end of the flanges.

SUMMARY OF THE INVENTION

Therefore, the object of the present invention is to provide a key cylinder device of the automobile which can arrange the antenna coil close to the end face of the key cylinder without harming the appearance, improve the transmitting and receiving sensitivity between the antenna coil and the circuit chip of the key plate, further suppress the occurrence of "sink" on the outer peripheral face of the antenna coil and improve the appearance and the quality of the antenna coil.

This invention provides a key cylinder device of an automobile which drives the control device which is the subject to be controlled by magnetic coupling between a circuit chip built in a key plate and a circular antenna coil fitted and fixed to the outside of the end portion of a key cylinder, wherein a core is formed by winding an antenna wire to a circular groove on the outer peripery of the bobbin and the antenna wire-wound portion on the outer periphery of the bobbin is covered with a base material of an amplifier case which is attached to the key cylinder, while the core is integrally molded on one side portion of the amplifier case in such a state that the one side end portion is exposed.

According to this invention, since the antenna coil is molded integrally with the amplifier case in such a state that the one side end portion of the core is exposed, no positioning trace at the time of molding is left on the end portion on the one side end portion, thereby the appearance of the antenna coil can be improved and the fixation of the antenna coil can be performed by fixing the amplifier case to the key cylinder, thus making it possible to reduce the number of parts and the number of the operation process for the assembly.

In one preferred embodiment of this invention, a flange of the outer exposed side on the outer periphery of the bobbin is formed so that it has a height higher than the flange on the side laid thereunder, and the antenna wire-wound portion is matched in the same plane with the flange end on the outer exposed side and covered with the amplifier case base material.

According to this preferred embodiment, the height of the flange on the outer exposed side of the bobbin can be formed sufficiently high up to the outer diameter of the antenna coil, thereby the flange is used as a wire guide to perform the winding operation of the antenna wire to the bobbin easily and smoothly.

Furthermore, since there is no covering layer of the base material of the amplifier case at the end of the flange of the one side end portion, the occurrence of "sink" on the outer surface of the base material of the amplifier case which covers the antenna wire-wound portion can be suppressed, thereby the appearance and the quality of the antenna coil can be further improved.

In another preferred embodiment of this invention, the end face of the antenna coil is roughly matched with the end face of the key cylinder and attached thereto.

According to this preferred embodiment, since the end face of the antenna coil is roughly matched with and attached to the end face of the key cylinder, the distance between the antenna coil and the circuit chip of the key plate at the time of insertion of the key plate into the key cylinder can be reduced, thereby the transmitting and receiving sensitivity between the antenna coil and the circuit chip can be enhanced.

Furthermore, since the end face of the antenna coil becomes the one side end portion of the core where the positioning trace is not caused at the time of molding, the appearance is not degraded, and both the improvement of the transmitting and receiving function and the improvement of the appearance can be achieved.

DESCRIPTION OF THE PREFERRED EMBODIMENT

The embodiment of the present invention will now be described in detail with reference to the accompanying drawings.

Figure 1:
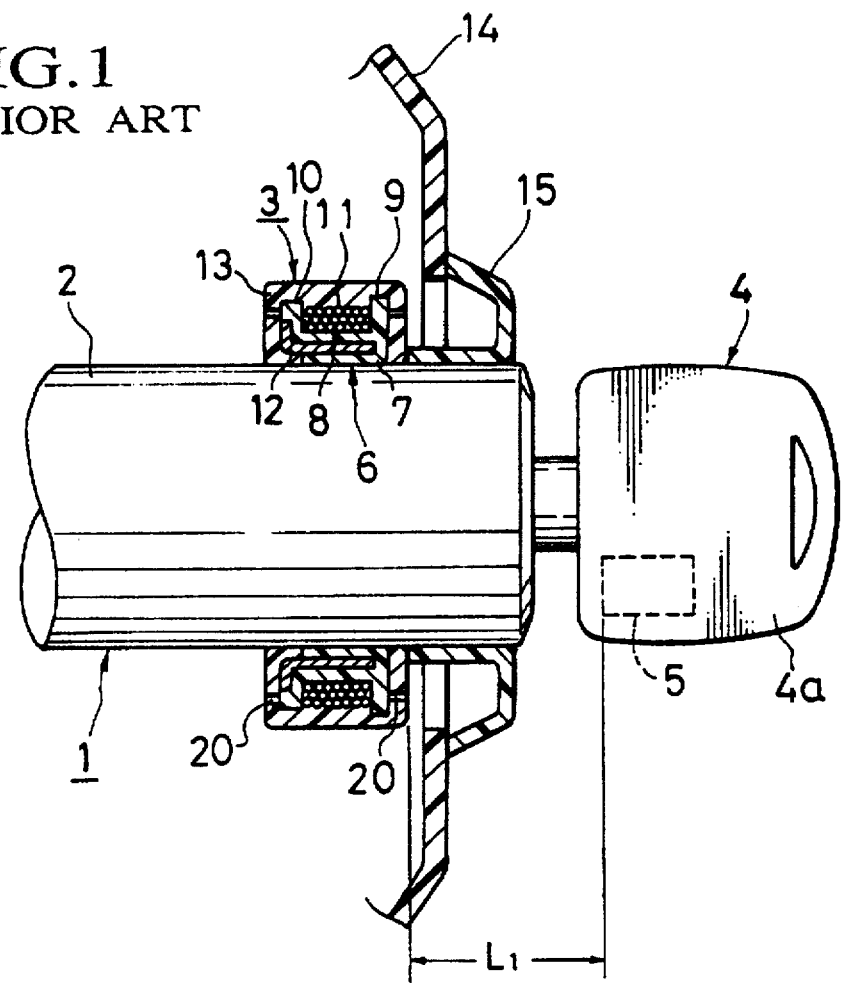
FIG. 1 is a sectional view illustrating the conventional structure.
Figure 2:
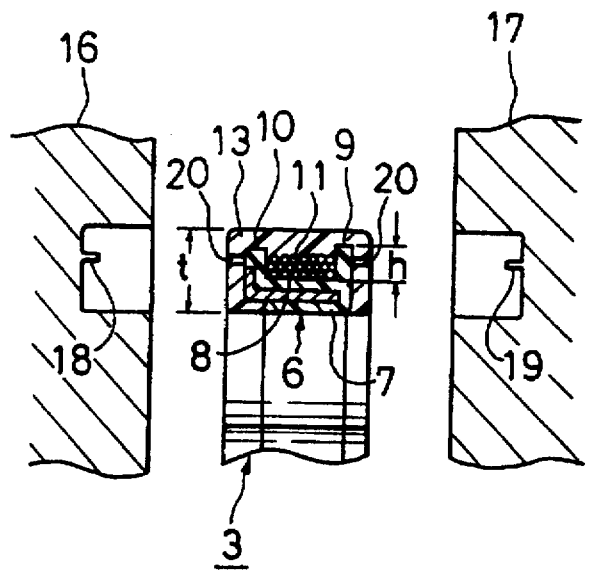
FIG. 2 is a sectional view of a coil antenna having a conventional structure.
Figure 3:
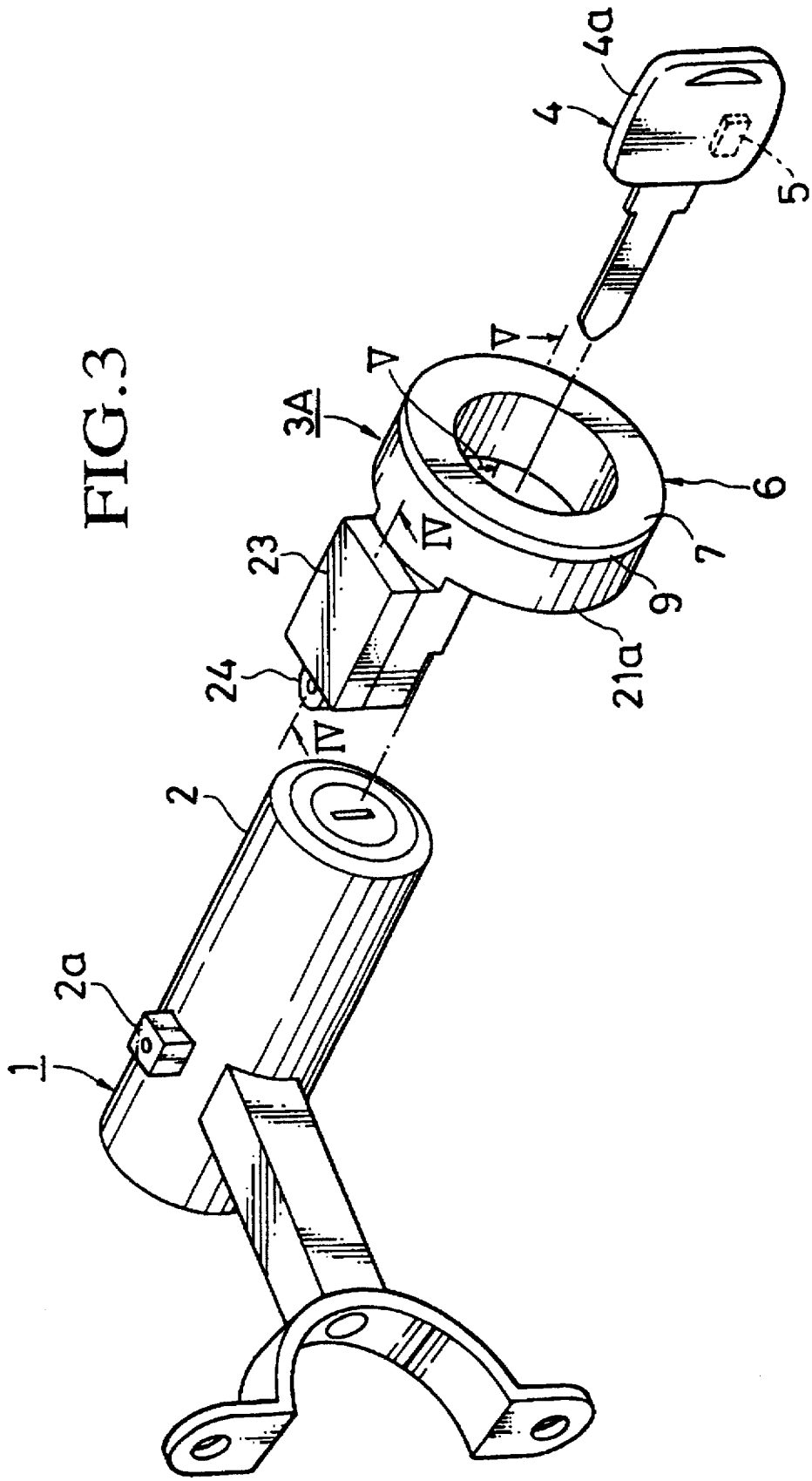
FIG. 3 is an exploded perspective view of one embodiment of the present invention.
Figure 4:
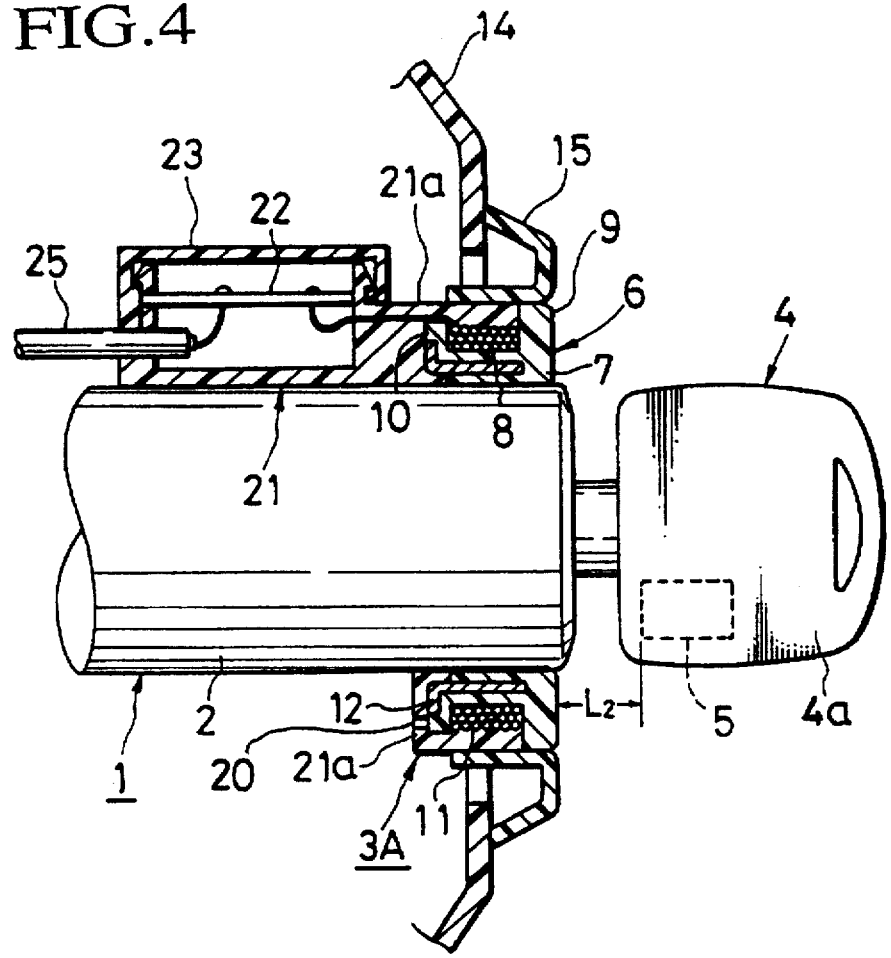
FIG. 4 is a sectional view of the assembled state along the line IV—IV in FIG. 3.

Referring to FIG. 3 and FIG. 4, reference number 3A represents an antenna coil which is fitted and attached to the outside of the end portion of the key cylinder 2, and has a core 6 which has the antenna wire 11 wound to the circular groove 8 on the outer periphery of the bobbin 7 comprising an electrically insulated material.

The bobbin 7 is reinforced by laying a magnetic core material 12 thereunder comprising a magnetic material such as ferrite and the like in a roughly cylindrical shape having a L-shaped section therein. The core 6 is molded integrally to the one side portion of the amplifier case 21 comprising a resin material in a state that its one side end portion which is composed of the flange 9 is exposed, and the antenna wire-wound portion on the outer periphery of the bobbin 7 including the other flange 10 is covered with the base material 21a of the amplifier case so as to mold the antenna coil 3A integrally with the amplifier case 21.

The flange 9 on the outer exposed side on the outer periphery of the bobbin 7 is formed so as to have a height higher than the flange 10 on the side where the flange is laid under the other amplifier case base material 21a, and the antenna wire-wound portion is covered with the amplifier case base material 21a to match with the end of the flange 9 in the same plane.

Namely, in the present embodiment, the flange 9 is formed to have a sufficient height up to the outer diameter of the antenna coil 3A.

Figure 5:
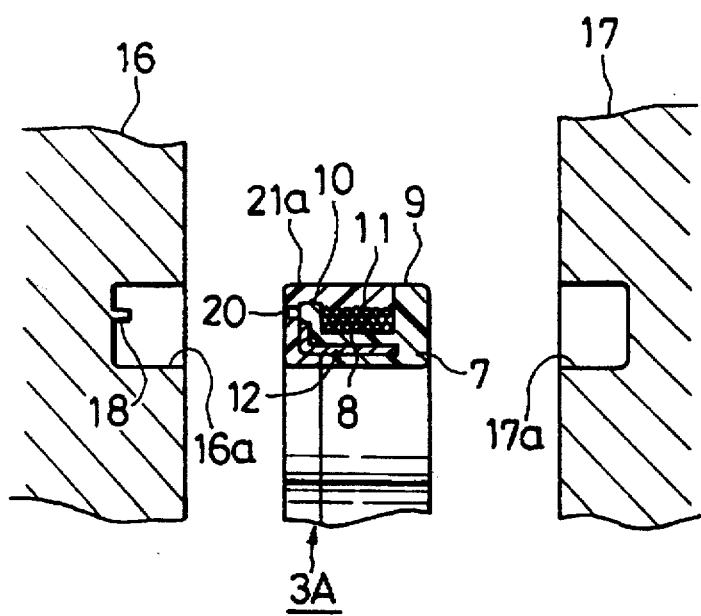
FIG. 5 is a sectional view along the line V—V in FIG. 3.

This antenna coil 3A is molded integrally with the amplifier case 21 by molds 16 and 17, as shown in FIG. 5, and the core 6 is molded integrally with the amplifier case 21 by fitting its one side end portion which is composed of the flange 9 into the mold face 17a of the one mold 17, and injecting a molten resin to a cavity formed by these molds 16 and 17 in the positioned state by pushing the core 6 to the mold face 17a of the one mold 17 by a positioning pin 18 projected in the mold face 16a of the other mold 16.

Therefore, on the side end portion of the antenna coil 3A which becomes the front side, the end portion of the bobbin 7 of the core 6 is directly exposed, as mentioned above, and no positioning trace at the time of molding is caused, though on the amplifier case 21 side of the general portion of the antenna coil 3A, that is, on the side end portion which becomes the back side, a hole 20 due to the positioning pin 18 is inevitably caused on the amplifier case base material 21a.

In the amplifier case 21, an amplifier circuit substrate 22 of a capacitor, a resister, IC and the like is assembled and a cap 23 is attached by hooking.

With fitting the antenna coil 3A to the end portion of the key cylinder 2, the amplifier case 21 is fixed by fastening the bracket 24 projected from the end portion of the case to the setting seat 2a provided on the outer periphery of the key cylinder 2, thereby the antenna coil 3A is also fixed to the outer periphery of the end portion of the key cylinder 2.

Here, since no positioning trace at the time of molding is caused at the one side end portion of the antenna coil 3A as described above, the antenna coil 3A is attached to the key cylinder by roughly matching the one side end portion, that is, the end portion which is composed of the flange 9 of the core 6 with the end face of the key cylinder 2, and the escutcheon 15 is fitted to the outer periphery of the antenna coil 3A to conceal and decorate the parting portion between the antenna coil 3A and the steering column cover 14.

In FIG. 4, the reference numeral 25 represents a harness of the amplifier circuit substrate 22.

According to the structure of the above-mentioned embodiment, since the end face of the antenna coil 3A is fixed so as to make its end face roughly matched with the end face of the key cylinder 2, when the key plate 4 is inserted into the key cylinder 2, the distance between the antenna coil 3A and the circuit chip 5 provided in the key head 4a can be reduced as much as possible as shown in $L_2$ of FIG. 4, therefore, the transmitting and receiving sensitivity between the antenna coil 3A and the circuit chip 5 can be improved to perform a secure communicatory operation.

Furthermore, since the end face of the antenna coil 3A is formed so that the one side end portion of the core 6 where the positioning trace is not caused at the time of molding is exposed outwardly, the appearance is not degraded, and both the improvement of the transmitting and receiving function and the improvement of the appearance can be achieved.

Furthermore, since the amplifier case 21 and the antenna coil 3A are integrally formed, the antenna coil 3A can be fixed by fixing the amplifier case 21 to the key cylinder 2, thereby a fixed structure exclusive for the antenna coil is not required, and cost reduction can be planned by reducing the number of parts and the number of operation processes for the assembly.

Moreover, the flange 9 on the outer exposed side of the bobbin 7 can be formed sufficiently high with the dimension of the outer diameter of the antenna coil 3A, thereby the automatic winding operation of the antenna wire 11 to the bobbin 7 which uses the flange 9 as a wire guide can be smoothly performed.

Furthermore, since there is no covering layer of the amplifier case base material 21a at the end of the flange 9 which composes the one side end portion of the bobbin 7, the occurrence of "sink" on the surface of the amplifier case base material 21a which covers the antenna wire-wound portion can be suppressed, which makes it possible not only to improve the appearance and the quality of the antenna coil 3A, but also to make it unnecessary to cover the end of the flange 9 with the amplifier case base material 21a. Therefore, poor molding which is likely to be caused in the one which is covered with a resin material up to the end of the flange 9 is not caused, and the yielding of products can be improved.

As described heretofore, according to the present invention, the effects mentioned below can be attained:

1) Since the antenna coil is molded integrally with the amplifier case in the state that the one side end portion of the core is exposed, no positioning trace at the molding is left at the one side end portion, thereby the appearance of the antenna coil can be improved.

2) Since the antenna coil can be fixed by fixing the amplifier case to the key cylinder, any fixed structure exclusive for the antenna coil is not required, and cost reduction can be planned by reducing the number of parts and the number of operation processes for the assembly.

3) Since the flange which composes the one side end portion of the bobbin is not covered with the amplifier case base material and exposed outside, the flange can be formed to have sufficient height up to the dimension of the outer diameter of the antenna coil. Therefore, the automatic winding operation of the antenna wire to the bobbin which uses the flange as a wire guide can be smoothly performed.

4) There is no covering layer of the amplifier case base material 21a at the end of the flange which composes the one side end portion of the bobbin, and the wire-wound portion is covered with the amplifier case base material to match in the same plane with this flange end, thereby any thick or thin portion of the covering layer is not caused between the flange end and the wire-wound portion, thereby the occurrence of "sink" on the surface of the antenna coil can be suppressed, and the appearance and the quality can be further improved.

5) No positioning trace at the molding is left at the one side end portion of the antenna coil. Therefore, even if the one side end portion is roughly matched with and attached to the end face of the key cylinder, and the one side end portion is exposed outside, the appearance is not degraded. Moreover, by the matching and attachment of the antenna coil with/to the end face of the key cylinder, the distance between the antenna coil and the chip circuit of the key plate is reduced to improve the transmitting and receiving sensitivity therebetween when the key plate is inserted into the key cylinder, and secure communicatory operation can be performed, thereby the reliability can be further improved.

It should be understood that many modifications and adaptations of the invention will become apparent to those skilled in the art and it is intended to encompass such obvious modifications and change in the scope of the claims appended hereto.

What is claimed is:

1. A key cylinder device of an automobile which drives a control device which is subject to control by a magnetic coupling between a circuit chip built in a key plate and a circular antenna coil fitted and fixed to an outside of an end portion of a key cylinder for transmitting data from the chip to the coil, comprising:

a core having an antenna wire wound to a circular groove on an outer periphery of a bobbin to form the circular antenna coil, and an antenna wire-wound portion on the outer periphery of said bobbin covered with a base material of an amplifier case which is attached to the key cylinder, wherein said core is integrally molded on one side portion of the amplifier case in such a state that one side end portion is exposed.

2. A key cylinder device of an automobile according to claim 1, wherein a first flange which composes an outer exposed side on the outer periphery of the bobbin is so formed that the first flange has a height higher than that of a second flange of the bobbin disposed behind the first flange, and the antenna wire-wound portion is covered with the amplifier case base material so that an outer periphery of the amplifier case base material and the first flange end on the outer exposed side are in a single plane.

3. A key cylinder device according to claim 2, wherein an end face of the bobbin is roughly matched with the end face of the outside end portion of the key cylinder and attached thereto.

* * * * *